Oct. 12, 1965 I. B. WEISE ETAL 3,211,174
PRESSURE RELIEF OR BLOWDOWN VALVE
Filed April 17, 1963 4 Sheets-Sheet 4

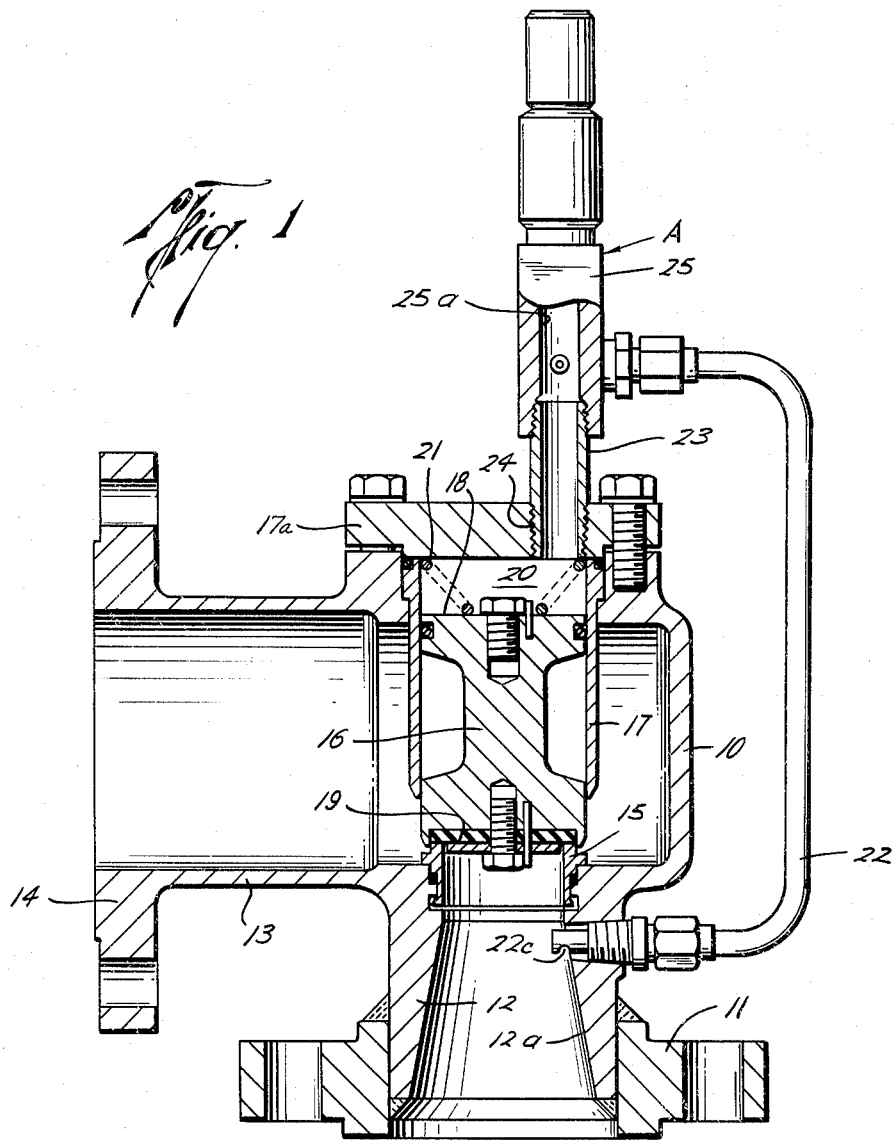

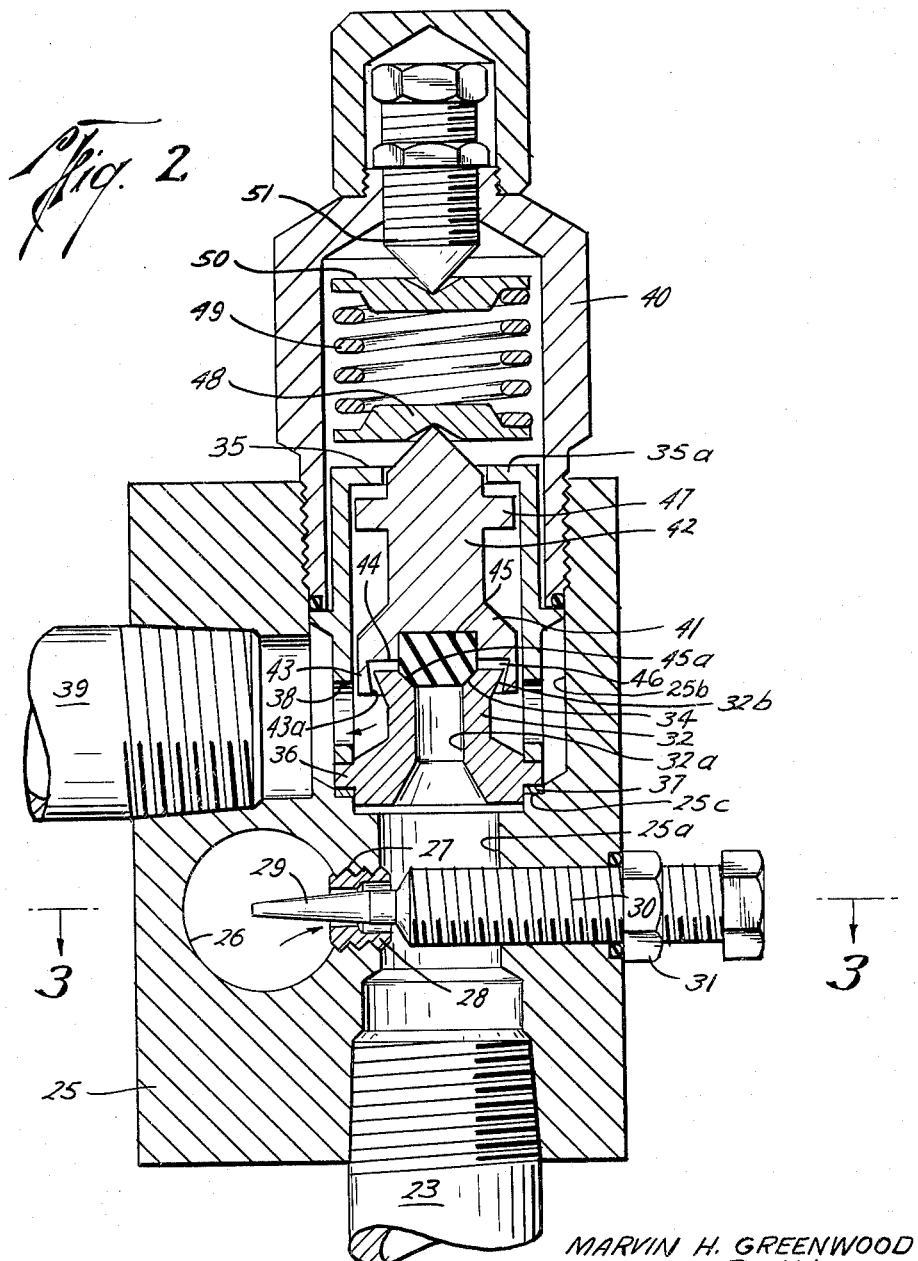

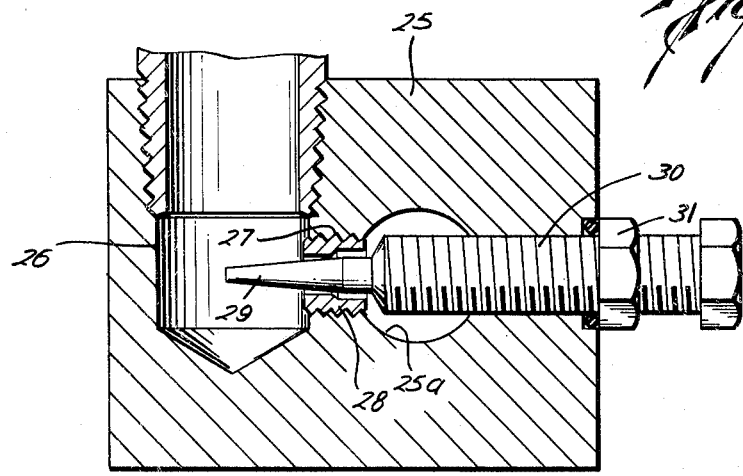
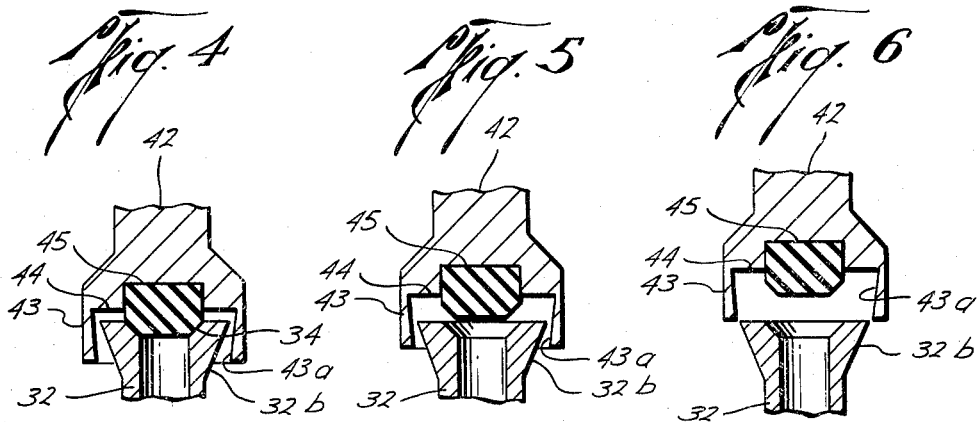

MARVIN H. GREENWOOD
Irvin B. Weise
INVENTOR.
BY
ATTORNEYS

United States Patent Office 3,211,174
Patented Oct. 12, 1965

3,211,174
PRESSURE RELIEF OR BLOWDOWN VALVE
Irvin B. Weise, Bellaire, and Marvin H. Greenwood, Houston, Tex., assignors to Anderson, Greenwood & Co., Houston, Tex., a corporation of Texas
Filed Apr. 17, 1963, Ser. No. 273,637
10 Claims. (Cl. 137—469)

This invention relates to new and useful improvements in pressure relief or blowdown valves and relates particularly to an improved pilot valve assembly for controlling the actuation of a main valve.

It is one object of the invention to provide an improved pressure relief or blowdown valve which is so constructed that close and accurate control of the pressure at which the main valve is actuated is maintained so that the relief of pressure or blowdown of the area being controlled may be accomplished with a minimum reduction in the pressure in said controlled area.

An important object of the invention is to provide an improved valve of the character described including a pilot valve assembly which, upon opening and closing, controls the opening and closing of the main relief or blowdown valve, said pilot valve assembly being arranged to operate with a snap action in moving to both open and closed position, whereby efficient operation of the main valve results.

A further object of the invention is to provide an improved pilot valve assembly for controlling the operation of the main valve, which assembly includes coacting valve and seat elements which are movable relative to each other; the movement of the valve and seat elements resulting in a control of the pressure which acts against the active surface of the pilot valve, whereby snap action movement of the valve is assured.

Still another object is to provide an improved pilot valve assembly which includes in combination therewith a pressure reduction means, which may be adjustable, located between the chamber within which the pilot valve is exposed and the area containing the pressure being controlled; said pressure reduction means coacting in the system in a manner to control the pressure present in the area being controlled at which the pilot valve will reseat to close the main or blowdown valve.

Still another object is to provide an improved pilot valve assembly in which coacting surfaces on the pilot valve and on the pilot valve seat may be varied to properly control the opening and closing pressure of the pilot valve, whereby the assembly may be adapted for use under desired pressure conditions.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a view, partly in section and partly in elevation, of an improved relief or blowdown valve, having a pilot assembly for controlling the operation of the main valve connected therewith;

FIGURE 2 is an enlarged vertical sectional view of the pilot valve assembly, said section being taken along a plane at a right angle to that shown in FIGURE 1;

FIGURE 3 is a horizontal cross-sectional view taken on the line 3—3 of FIGURE 2;

FIGURES 4, 5 and 6 are schematic views of the pilot valve and its seat and showing the valve in closed, intermediate and wide-opened positions.

Figure 7:
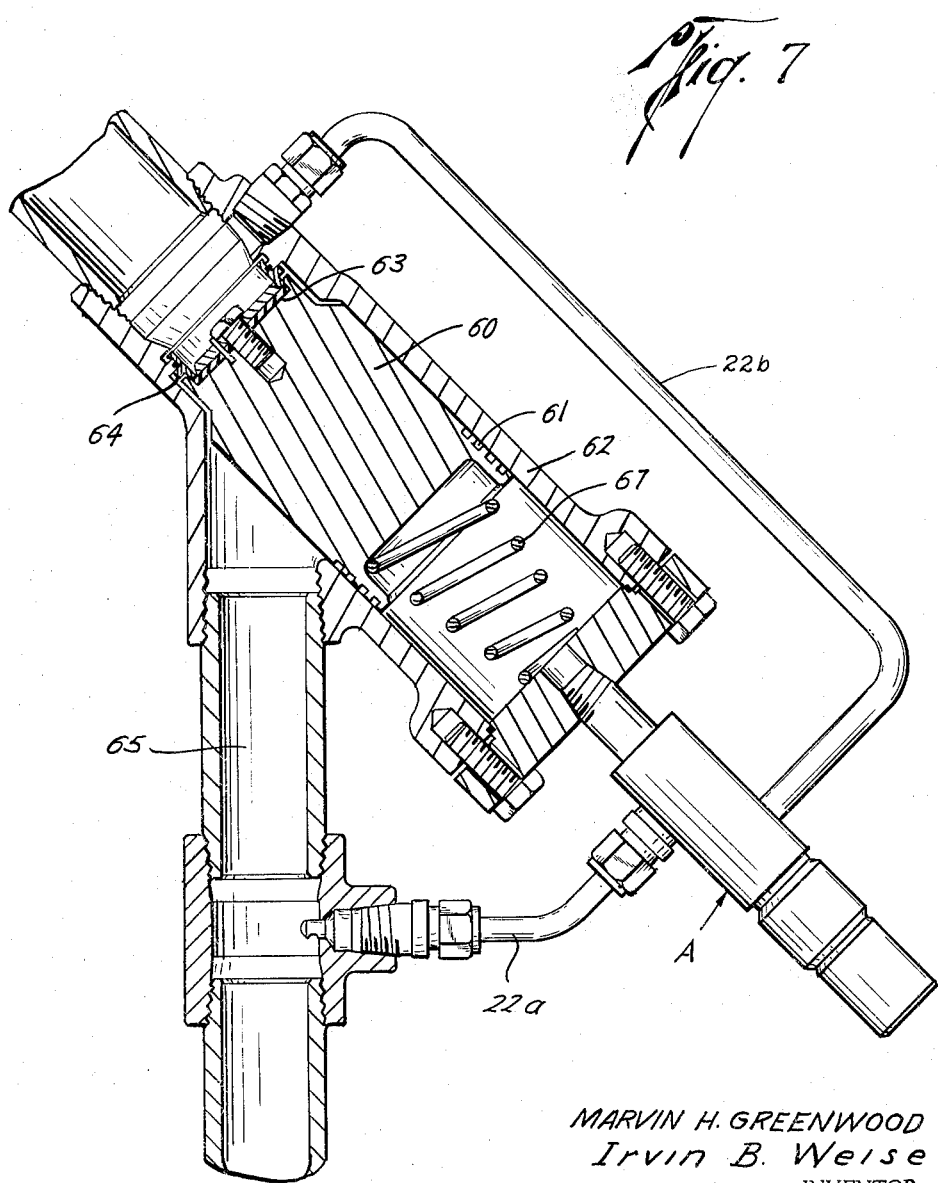
FIGURE 7 is a sectional view of a modified form of the invention.

In the drawings, numeral 10 designates a main body or housing having a base flange 11 welded or otherwise suitably secured to a depending tubular portion 12. A lateral tubular extension 13, having a connecting flange 14, extends from the body and is preferably made integral therewith. The flange 11 is adapted to be connected to a vessel, pipeline or other pressure area (not shown) in which it is desired to maintain and control the pressure. The tubular extension 13 may be connected to any suitable line extending to a lower pressure area, such as atmosphere.

Within the body 10 is a valve seat 15 and adapted to coact with said seat is a main valve member 16. The upper portion of the main valve member 16 is slidable within a cylinder 17 and the cross-sectional area 18 of the upper surface of said valve member is larger than the cross-sectional area 19 at the lower end of the member. With the valve in a seated position, the lower end of the main valve member is exposed to the pressure in the vessel or other area to be controlled and such pressure is acting to urge the valve member toward an unseated position. When the valve is open, it is evident that pressure from the controlled area may flow outwardly through the tubular extension 13.

The upper end of the cylinder 17, within which the main valve member 16 is movable, is closed by a cover plate 17a and the lower end of said plate is spaced from the upper end of the valve member whereby a chamber 20 is formed above the main valve member. A light spring 21 normally urges the main valve member 16 toward a seated position. As will be explained, the pressure from the controlled area or vessel is conducted to the chamber 20 above the main valve member and since the upper end of said valve member is of larger cross-sectional area than its lower end, equal pressures above and below the valve will maintain the valve in a seated position. When pressure in the chamber 20 is reduced to a predetermined point in relationship to the pressure acting on the lower end of the valve member, said valve member will be opened to relieve some of the pressure within the controlled area.

For conducting the pressure from the controlled area which enters the bore 12a in the lower end of the tubular portion 12 to the chamber 20 above the main valve, a conductor tube 22 is provided. This tube has its inner end extending into the interior of the bore 12a and is provided with a port 22c whereby pressure may enter the tube 22. The upper end of tube 22 has connection with a pilot valve assembly which is generally indicated by the letter A. This assembly is connected through a nipple 23 with an opening 24 in the cover plate 19. The pilot valve assembly A includes a housing 25 having an opening 26 extending through one wall thereof whereby the tube 22 may be connected therewith and thus pressure may be conducted into the bore 25a of the pilot valve assembly housing 25. As shown in FIGURE 2, the port 26 to which the tube 22 is connected is at one side of the housing and extending from this port to the bore 25a of the housing 25 is a horizontally disposed opening 27 within which is mounted a valve seat 28. A tapered needle valve 29 is movable relative to the seat 28 and is adjustable by reason of its threaded shank 30 being threaded into the body 25. A suitable lock nut 31 will hold the needle valve in adjusted positions with respect to the valve seat 28.

From the foregoing it will be seen that with the main valve 16 in its closed position, as shown in FIGURE 1, the pressure from the controlled area or vessel which is present in the bore 12a at the lower end of the body 10 is conducted upwardly through tube 22 and into the lateral opening 26. From this opening 26, which is formed in the wall of the housing 25, the pressure must flow past the needle valve 29 in order to enter the main bore 25a of the pilot valve assembly body 25. By adjusting the needle valve, a desired pressure drop is created at the seat 28. Assuming the pilot valve, which will be hereinafter described, to be closed, the pressure which flows from the main bore 25a through the nipple 23 and into the chamber 20 above the main valve member 16 is the same as the pressure which is acting on the lower end of the valve. Under such conditions, the main valve member 16 remains in a seated position because with pressures equalized across said main valve, the greater upper area of the valve will maintain the valve in seated position.

When there is an opening of the pilot valve of the pilot valve assembly A, pressure may escape from the chamber 20 through the bore 25a of the pilot valve assembly housing 25 and when this pressure is reduced a predetermined amount in accordance with the difference in areas on the main valve, the pressure below the main valve lifts said valve and permits the discharge of pressure from the controlled area which has communication with the lower end of the body. The pilot valve, which will be hereinafter described in detail, thus controls the operation of the main valve; upon opening of the pilot valve and reduction of pressure in chamber 20, the main valve is opened and upon reseating of the pilot valve, which again allows pressure equalization above and below the main valve, said main valve is closed.

The pilot valve is clearly shown in FIGURE 2 and is mounted within a counterbore 25b which is enlarged and extends upwardly from the main bore 25a of the housing 25. A pilot valve seat 32, having a conical seating surface 34, is disposed in the lower end of the counterbore and the valve seat member has an axial bore 32a. A tubular cage 35 has its lower end engaging an annular flange 36 provided on the valve seat member 32 and maintains the same in position on the shoulder 25c formed between the bore 25a and the counterbore 25b. If desired, a suitable sealing gasket 37 may seal with said shoulder. The tubular cage 35 is formed with side outlet openings 38 which communicate with a lateral vent pipe or tube 39. Said cage is maintained in position within the counterbore of the housing by a threaded tubular retaining cap 40, said cap being threaded into the upper end of the counterbore.

Movable within the cage within certain limits is the pilot valve element 41. This element comprises a main body 42 which is enlarged at its lower end and provided with an annular depending skirt portion 43. The inner annular surface 43a of the annular skirt 43 is inclined at an angle to the axis of the valve member. Similarly, the exterior upper surface of the valve seat member 32 is inclined as shown at 32b, such inclination being at an angle to the axis but being different than the angle of the internal annular surface 43a. The purpose of these two surfaces will be hereinafter described in detail.

The lower surface or area 44 of the pilot valve body 42 has a valve element 45 which is preferably of a deformable material mounted at its central portion. This valve element has seating surfaces 45a adapted to engage the seating surface 34 of the valve seat member. When the element 45 is in seated position as shown in FIGURE 2, a space 46 is provided between the surface 44 of the valve body 42 and the upper end of the valve seat member.

The downward movement of valve element 45 is, of course, limited by the engagement with the seat 34. Its upper movement is limited by an annular flange 47 which is disposed below the upper end 35a of the retaining cage 35. The upper end 35a of the cage has an opening so that the upper conical end of the body 42 may extend therethrough and engage a retaining plate 48 which, in turn, is contacted by a coil spring 49. An upper retaining plate 50 engages the spring and is contacted by an adjusting screw 51 whereby the tension of the spring 49 may be readily varied.

With the construction above described, it will be evident that the valve element 45, when in a seated position, is exposed to the pressure in the bore 25a of housing 25 and this is the same pressure as is present within the chamber 20 above the main valve. The coil spring 49 is constantly urging the valve element 45 into engagement with the seat and until the pressure below said seat is sufficient to overcome the force of the spring, the valve element will remain in a seated position. As explained, when the pilot valve element is in a seated position, pressures above and below the main valve element are equalized and the main valve member 16 remains in its seated or closed position.

The operation of the pilot valve with respect to its seat is illustrated in FIGURES 4 to 6. In FIGURE 4, valve element 45 is in position engaging the seat 34 and at this time, the annular skirt 43 of body 42 surrounds the upper inclined portion 32b of the valve seat member 32. When the pressure in bore 25 rises to a predetermined point as determined by the adjustment of spring 49, valve element 45 is moved upwardly off of its seat. Immediately that the valve element leaves its seat, this exposes the entire undersurface 44 of the valve member body 42 to the pressure and because of the amplified surface suddenly exposed to the same pressure which was acting on the smaller area valve element 45, the entire valve body 42 moves upwardly with a snap action.

In FIGURE 5, the valve element is illustrated as in an intermediate position, that is, between completely closed and completely opened positions. It will be noted that at this time by reason of the difference in the angular surfaces 43a and 32b, the area which is the annular space between skirt and valve seat member is gradually reduced. Therefore, as the valve element 45 moves upwardly, there is a reduction in the annular space which tends to create a pressure drop which functions to cause the valve to snap to a full open position. The full open position is illustrated in FIGURE 6 and by reason of the difference in angles between surfaces 43a and 32b, the annular space between the skirt and the valve seat member is at a minimum. Of course, when the valve moves to an open position, pressure from the bore 25a and, therefore, from the chamber 20 above the main valve, may escape through the lateral outlet 39 and as this pressure reduces, the main valve is moved to an open position as has been explained.

When the main valve opens, there is a reduction in the pressure from the area being controlled, which is that pressure in the bore 12a in the lower portion of the valve body 10 and also in the tube 22. At the same time and because of the pressure reduction created by the needle valve 29, the pressure in bore 25a of the pilot valve housing will continue to reduce since it is escaping through the outlet 39. When pressure in the bore 25a reduces to a point where the spring 49 acting on the body 42 of the valve element 45 can move said element downwardly, the initial downward movement causes the skirt 43 of the valve body 42 to move downwardly with respect to the valve seat. As this occurs, as shown in FIGURE 5, the annular space between the surface 43a and the surface 32b increases in size to reduce the restriction at this point and this permits faster escape of pressure from below the valve member acting on surface 44 so that the valve 45 snaps downwardly to its seated position, as shown in FIGURE 4. It is thus evident that the coaction between the annular skirt and the valve seat member, results in assuring a snap action on the pilot valve as it moves either to an open position or to a closed position.

The provision of the pressure drop provided by the needle valve 29 allows for a control of the pressure which must be reached in the controlled area or in the bore 12a at the lower end of the main valve 10 at which the pilot valve will return to its seated position. Although it is desirable that an adjustable needle valve be employed by reason of the convenience of being able to change the reseating pressure of the control vessel, it is evident that a fixed orifice, which creates the required pressure drop between the tube 22 and the bore 25a, could be employed. By employing a needle valve, it is obvious that any pressure drop which may be desirable can take place between the tube 22 which, of course, is the pressure of the controlled area, and the bore 25a. By varying the pressure drop at this point, the pressure, which must be present in the controlled area such as a vessel or pipe line in order for the pilot valve to reseat, can be accurately controlled. As an example, if the opening pressure required in accordance with the spring adjustment 49 and the pilot valve areas is 510 lbs., the valve element 45 is unseated when the pressure in the controlled area reaches 510 lbs. The valve snaps to an open position, reduces the pressure in chamber 20 and opens the main valve. However, as soon as the pilot valve opens and because of the restriction or pressure drop caused by the needle valve 29, the pressure in bore 25a will quickly drop to approximately 255 lbs. As pressure in the tube 22 drops another 5 lbs., the restriction, assuming it to be a 50% pressure drop, will result in the pressure in 25a dropping sufficiently to snap the pilot valve closed. It is thus apparent that only a very small drop in the pressure in the controlled area is necessary in order to open and close the pilot valve and yet the pilot valve may have a wide range between opening and closing pressures. In the example given, the opening pressure can be 510 lbs., and the closing pressure can be approximately 252 lbs. with only a 5-lb. reduction in pressure in the controlled area. Obviously, by adjusting the needle valve or changing the orifice through an orifice nipple to get any desired pressure drop between the tube 22 and the bore 25a, the action of the pilot valve may be accurately set in accordance with any desired conditions.

The pressure drop which is upstream of the pilot valve assembly is, of course, one of the controlling factors but as explained with reference to FIGURES 4 to 6, the change in annular or peripheral space between the valve element skirt and the valve seat is a second factor and by properly arranging these surfaces in relationship to the pressure drop which is located upstream of the pilot valve assembly, substantially any desired operation to meet any desired conditions can be effected.

In FIGURES 1 through 6, the improved pilot valve assembly has been shown as applied to a main valve member which is, in effect, a piston-type valve having different areas. In FIGURE 7, a modified form of the invention is shown where the pilot valve assembly A is combined with a piston valve 60. In this application, the piston is provided with the usual piston rings 61 moving within a cylinder 62 and one end of said piston forms a valve 63 which engages a seat 64. Communicating with one end of the cylinder is a conductor 65 which extends to the vessel or line in which pressure is to be controlled. In such case, a tube 22a similar to the tube 22 conducts the pressure to the pilot valve assembly.

In the operation of this form of the invention, the pressure in the conductor 65 and the pressure in the cylinder 62, which pressure is acting to urge the piston 60 to a seated position, is the same when the pilot valve of the assembly A is closed. Since these pressures are equalized at the time that the piston 60 is seated, there need be no concern about leakage of pressure from the conductor 65 past the piston rings 61 and into the cylinder 62. Thus a sealing problem at this point is completely eliminated. When the pilot valve opens, the operation is identical to that heretofore described in that pressure acting on the piston 60 is reduced by reason of the escape or venting of such pressure through a vent tube 22b. The pressure in conductor 65 may pass around the opposite end of the piston and immediately will move the piston against the light spring 67 so that the valve 63 is unseated. This results in a relief or blowdown of the pressure in the vessel or line to which the conductor 65 is connected. The assembly A is substantially the same as that shown in FIGURE 1 and, of course, the pressure drop restriction or needle valve would also be employed in this form.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:
1. As a sub-combination in a pilot valve assembly, a valve seat and valve element comprising,
  a tubular seat member having an axial bore and having the upper portion of its exterior surface flared outwardly at a predetermined angle relative to its axis,
  a solid valve element body having an annular depending skirt which encircles the flared portion of the tubular seat member,
  the inner annular surface of said skirt being inclined inwardly toward its lower end, with its angle of inclination relative to the axis of the body and of the seat member being greater than the angle of inclination of the flared portion of said member, whereby as the body moves upwardly relative to the seat, the area of the annular space between the skirt and seat member decreases,
  and a valve seating element mounted in the central portion of the valve element body and engageable with the upper end of the tubular seat member to close the bore through said member.

2. The sub-combination set forth in claim 1, wherein the valve seating element extends into a plane below the lower surface of the solid body from which the skirt depends, whereby when the valve seating element is in engagement with the seat member, a space is present between said lower surface and the upper end of said seat member.

3. A safety relief valve device for controlling the pressure within a controlled area including,
  a main valve member having one side communicating with said controlled area for relieving the pressure therein when said member is in an open position,
  a housing having a chamber in communication with the second side of the valve member,
  means for conducting the pressure within the controlled area to the chamber, whereby said second side is exposed to said pressure in all positions of said main valve member,
  equalization of pressures across said valve member maintaining said member in the closed position and unequalization of pressures across said member maintaining said member in the open position,
  a pilot valve assembly including a pilot valve element movable with respect to a pilot valve seat and exposed to the pressure in said chamber,
  said pilot valve element venting the pressure from the chamber when said pilot valve element is in an open position to unequalize the pressures across said main valve member and thereby open the same to relieve the pressure from said controlled area,
  said pilot valve element being responsive to the pressure in said chamber and being opened when said pressure reaches a preselected pressure and being closed when said pressure reduces to a second preselected pressure,
  coacting surfaces forming part of said pilot valve assembly defining a discharge orifice through said pilot valve assembly downstream of the pilot valve seat and forming a space between said seat and the discharge orifice,
  one of said coacting surfaces being movable relative to the other with the pilot valve element,
  said coacting surfaces being tapered relative to each other so that as the pilot valve element moves from fully opened position to closed position the effective area of the orifice is increased thereby causing the pressure fluid in said space to escape at an increased rate and permit the movement of the pilot valve element with a snap action from its opened to its closed position when the chamber pressure reduces to said second pre-selected pressure, variable means controlling the degree of pressure reduction which occurs in the chamber in relationship to the drop in pressure which is occurring in the controlled area by reason of said pilot valve assembly and said main valve member being open, the relationship of said pressure reduction in the chamber to the pressure reduction in the controlled area determining the pressure in the controlled area at which the pilot valve will close.

4. A relief valve device as set forth in claim 3 wherein, said main valve member has unequal areas on opposite sides exposed to pressure with the larger area being on said second side of the main valve member.

5. A safety relief valve device for controlling the pressure within a controlled area including, a main valve member having one side communicating with said controlled area for relieving the pressure therein when said member is in an open position, a housing having a chamber in communication with the second side of the valve member, means for conducting the pressure within the controlled area to the chamber, whereby said second side is exposed to said pressure in all positions of said main valve member, equalization of pressures across said valve member maintaining said member in the closed position and unequalization of pressures across said member maintaining said member in the open position, a pilot valve assembly including a pilot valve element movable with respect to a pilot valve seat and exposed to the pressure in said chamber, said pilot valve element venting the pressure from the chamber when said pilot valve element is in an open position to unequalize the pressures across said main valve member and thereby open the same to relieve the pressure from said controlled area, said pilot valve element being responsive to the pressure in said chamber and being opened when said pressure reaches a preselected pressure and being closed when said pressure reduces to a second pre-selected pressure, coacting surfaces forming part of said pilot valve assembly defining a discharge orifice through said pilot valve assembly downstream of the pilot valve seat and forming a space between said seat and the discharge orifice, one of said coacting surfaces being movable relative to the other with the pilot valve element, said coacting surfaces being tapered relative to each other so that as the pilot valve element moves from fully opened position to closed position the effective area of the orifice is increased thereby causing the pressure fluid in said space to escape at an increased rate and permit the movement of the pilot valve element with a snap action from its opened to its closed position when the chamber pressure reduces to said second pre-selected pressure, means for varying the cross-sectional area of the conducting means and located in said conducting means for controlling the degree of pressure reduction which occurs in said chamber in relationship to the drop in pressure which is occurring in the controlled area by reason of said pilot valve assembly and said main valve member being open, the relationship of said pressure reduction in the chamber to the pressure reduction in the controlled area determining the pressure in the controlled area at which the pilot valve will close.

6. A safety relief valve device for controlling the pressure within a controlled area including, a main valve member having one side communicating with said controlled area for relieving the pressure therein when said member is in an open position, a housing having a chamber in communication with the second side of the valve member, means for conducting the pressure within the controlled area to the chamber, whereby said second side is exposed to said pressure in all positions of said main valve member, equalization of pressures across said valve member maintaining said member in the closed position and unequalization of pressures across said member maintaining said member in the open position, a pilot valve assembly including a pilot valve element movable with respect to a pilot valve seat and exposed to the pressure in said chamber, said pilot valve means venting the pressure from the chamber when said pilot valve means is in an open position to unequalize the pressures across said main valve member and thereby open the same to relieve the pressure from said controlled area, said pilot valve means being responsive to the pressure in said chamber and being opened when said pressure reaches a preselected pressure and being closed when said pressure reduces to a second preselected pressure, coacting surfaces forming part of said pilot valve assembly defining a discharge orifice through said pilot valve assembly downstream of the pilot valve seat and forming a space between said seat and the discharge orifice, one of said coacting surfaces being movable relative to the other with the pilot valve element, said coacting surfaces being tapered relative to each other so that as the pilot valve element moves from fully opened position to closed position the effective area of the orifice is increased thereby causing the pressure fluid in said space to escape at an increased rate and permit the movement of the pilot valve element with a snap action from its opened to its closed position when the chamber pressure reduces to said second pre-selected pressure, a restriction in the conducting means for controlling the degree of pressure reduction which occurs in the chamber in relationship to the drop in pressure which is occurring in the controlled area by reason of said pilot valve means and said pilot valve means and said main valve member being open, the relationship of said pressure reduction in the chamber to the pressure reduction in the controlled area determining the pressure in the controlled area at which the pilot valve will close, and means accessible from the exterior of said device for varying the size of said restriction.

7. A safety valve device for controlling the pressure within a controlled area including, a main valve member having one side exposed to the pressure in said controlled area, means for conducting the controlled area pressure to the second side of said main valve member to act thereupon, equalization of pressures across said main valve member maintaining said member in closed position and unequalization of said pressures maintaining the member in open position to relieve pressure in the controlled area and thereby reduce said pressure, a pilot valve assembly including a pilot valve element and seat, said element being exposed to the pressure acting on said second side of the main valve and being moved to open position when the pressure exceeds a preselected pressure to vent said pressure and effect opening of the main valve, said pilot valve assembly including means for closing the same at a preselected pressure substantially lower than the pressure required to open the same, coacting surfaces forming part of said pilot valve assembly defining a discharge orifice through said pilot valve assembly downstream of the pilot valve seat and forming a space between said seat and the discharge orifice, one of said coacting surfaces being movable relative to the other so that as the pilot valve moves from fully opened to close position the effective area of said orifice is increased thereby causing the pressure fluid in said space to escape at an increased rate and permit movement of the pilot valve element with a snap action from open to closed position when the preselected pressure is attained, means solely responsive to a preselected pressure reduction in the controlled area by reason of opening of the main valve for producing the preselected closing pressure at which the pilot valve recloses whereby the main valve is closed when said predetermined pressure reduction occurs in said controlled area, and means accessible from exterior for adjusting said last-named means to vary the pressure in the controlled area at which pilot valve closes.

8. A pilot valve device comprising, a housing forming a chamber and having a vent, means for conducting pressure into said chamber, a pilot valve assembly including a pilot valve seat within the housing between the vent and conducting means and a pilot valve element engageable with said seat to close the vent and prevent escape of the pressure from said chamber, said pilot valve seat having an annular exterior surface, said pilot valve seat having an axial bore therethrough in communication with said chamber, said pilot valve element being exposed to the pressure in the chamber which urges said element toward its unseated position, said pilot valve element having an annular depending skirt which encircles the annular exterior surface of the pilot valve seat and coacting therewith to form a discharge orifice between the surfaces and to also form a space between the valve element and said seat, resilient means of predetermined force acting on said pilot valve element and urging said element toward its seated position, said pilot valve element having a smaller effective area exposed to said pressure in said chamber when said element is in the seated position than when said element is in the unseated position whereby after unseating said element remains in the unseated position until the pressure acting thereon is substantially reduced, the inner annular surface of said skirt and the exterior annular surface of said pilot valve seat being tapered relative to each other so that as the pilot valve element moves from the fully opened position to closed position the effective area of the orifice is increased thereby causing the pressure fluid in said space to escape at an increased rate and permit the movement of the pilot valve element with a snap action from its opened to its closed position when the chamber pressure reduces to said second preselected pressure, a variable restriction in said conducting means upstream of said chamber to create a variable pressure drop therein to compensate for manufacturing tolerances in said pilot valve assembly and whereby the pressure in said chamber may be varied even though the pressure upstream of said variable restriction remains constant.

9. A pilot valve assembly as set forth in claim 8 wherein, said variable restriction in said conducting means comprises an annular seating surface and an adjustable tapering needle valve whereby the pressure drop created by said variable restriction may be varied in accordance with desired operating conditions, and together with means accessible from the exterior of said device for varying the size of said restriction.

10. A pilot valve assembly as set forth in claim 8 wherein, said variable restriction in said conducting means comprises an annular seating surface and an adjustable tapering needle valve whereby the pressure drop created by said variable restriction may be varied in accordance with desired operating conditions, and also wherein the resilient means comprises a spring, together with means for adjusting said spring to vary the force acting to seat the pilot valve element to thereby determine the pressure at which the pilot valve element will be unseated, and means accessible from the exterior of said device for varying the size of said restriction.

References Cited by the Examiner

UNITED STATES PATENTS

| | | | |
|---|---|---|---|
| 1,124,203 | 1/15 | Bingley | 137—543.23 XR |
| 1,660,382 | 2/28 | Hopkins | 137—491 |
| 1,719,686 | 7/29 | Browne | 137—489 |
| 2,151,501 | 3/39 | Corcoran | 137—469 XR |
| 2,517,858 | 8/50 | Farris | 137—469 |
| 2,759,488 | 8/56 | Garrett et al. | 137—491 |

M. CARY NELSON, *Primary Examiner.*

MARTIN P. SCHWADRON, *Examiner.*